(12) United States Patent
Martin et al.

(10) Patent No.: US 8,069,185 B2
(45) Date of Patent: Nov. 29, 2011

(54) INFORMATION RETRIEVAL

(75) Inventors: Trevor P Martin, Dursley (GB);
Behnam Azvine, Kesgrave (GB)

(73) Assignee: BRITISH TELECOMMUNICATIONS public limited company, London (GB)

(*) Notice: Subject to any disclaimer, the term of this patent is extended or adjusted under 35 U.S.C. 154(b) by 1306 days.

(21) Appl. No.: 10/549,365

(22) PCT Filed: Feb. 24, 2004

(86) PCT No.: PCT/GB2004/000744
§ 371 (c)(1),
(2), (4) Date: Sep. 14, 2005

(87) PCT Pub. No.: WO2004/086255
PCT Pub. Date: Oct. 7, 2004

(65) Prior Publication Data
US 2006/0179074 A1    Aug. 10, 2006

(30) Foreign Application Priority Data
Mar. 25, 2003  (GB) .................................. 0306877.2

(51) Int. Cl.
*G06F 17/30* (2006.01)
(52) U.S. Cl. ........................................................ 707/802
(58) Field of Classification Search ................... 707/1–3
See application file for complete search history.

(56) References Cited

U.S. PATENT DOCUMENTS

| | | | |
|---|---|---|---|
| 5,123,103 A | | 6/1992 | Ohtaki et al. |
| 5,278,980 A | * | 1/1994 | Pedersen et al. ............ 1/1 |
| 5,404,506 A | | 4/1995 | Fujisawa et al. |
| 5,694,592 A | * | 12/1997 | Driscoll ................... 1/1 |
| 5,696,962 A | * | 12/1997 | Kupiec .................... 1/1 |
| 5,706,497 A | * | 1/1998 | Takahashi et al. ........... 1/1 |
| 5,794,050 A | * | 8/1998 | Dahlgren et al. .......... 717/144 |
| 5,933,822 A | * | 8/1999 | Braden-Harder et al. ...... 1/1 |
| 6,175,829 B1 | * | 1/2001 | Li et al. .................. 1/1 |
| 6,453,312 B1 | | 9/2002 | Goiffon et al. |
| 2003/0033288 A1 | * | 2/2003 | Shanahan et al. .......... 707/3 |
| 2003/0069877 A1 | * | 4/2003 | Grefenstette et al. ....... 707/2 |

FOREIGN PATENT DOCUMENTS

| | | |
|---|---|---|
| GB | 2260007 A | 3/1993 |
| WO | WO 01/75682 A1 | 10/2001 |
| WO | WO 02/05137 A2 | 1/2002 |

OTHER PUBLICATIONS

Sebastiani, Fabrizio. "Machine Learning in Automated Text Categorization". Mar. 2002, ACM Computing Surveys, vol. 34, No. 1, pp. 1-47.*

(Continued)

Primary Examiner — Sheree Brown
(74) Attorney, Agent, or Firm — Nixon & Vanderhye P.C.

(57) ABSTRACT

A concept dictionary is generated and/or updated in respect of an information system. The concept dictionary is used to assist in selecting queries and query terms for use in interrogating the information system. A lexical reference source is first used to generate queries semantically related to a query entered by a user, and the answers returned for each query are analyzed using a fuzzy processing technique to determine semantic relationships between the queries. The queries and the determined relationships are recorded in a concept dictionary for subsequent use.

11 Claims, 3 Drawing Sheets

OTHER PUBLICATIONS

Mena et al., "Observer: An Approach for Query Processing in Global Information Systems based on Interoperation Across Pre-existing Ontologies", Cooperative Information Systems, 1996, Proceedings, First IFCIS International Conference on Brussels, Belgium Jun. 19-21, 1996, Los Alamitos, CA, USA, IEEE Comput. Soc. P., US, Jun. 19, 1996, pp. 14-25, XP010200745.

Mena et al., "Obserer: An Approach for Query Processing in Global Information Systems based on Interoperation Across Pre-Existing Ontologies", Distributed and Parallel Databases, Lkuwer, NL, vol. 8, No. 2, Apr. 2000, pp. 1-50, XP002201997.

Visser et al., "Resolving Ontological Heterogeneity in the KRAFT Project" Database and Expert Systems Appliations 19999, Proceedings, Tenth International Workshop on Florence, Italy Sep. 1-3, 1999, Los Alamitos, CA, USA, IEEE Comput. Soc., US, Sep. 1, 1999, pp. 668-677, XP002201998.

Takagi et al., "Realization of Sound-scape Agent by the Fusion of Conceptual Fuzzy Sets and Ontology", Fuzzy Systems Conference Proceedings, 1999, FUXX-IEEE '99. 1999 IEEE International Seoul, South Korea 22-25, Aug. 1999, Piscataway, NJ, USA, IEEE, US, Aug. 22, 1999, pp. 801-806, XO010350907.

Cross et al., "Fuzzy Ontologies for Multilingual Document Exploitation", North American Fuzzy Information, 1999, 18th International Conference of the NAFIPS New York, NY USA, IEEE, US, Jun. 10, 1999, pp. 392-397, XP010343038.

Grantneer et al., "Hybrid Fuzzy-Boolean Automata for Ontological Controllers", Fuzzy Systems Proceedings, 1998, IEEE World Congress on Computational Intelligence, The 1998 IEEE International Conference on Anchorage, AK, USA May 4-9, 1998, New York, NY, USA, IEEE, US May 4, 1998, pp. 400-404, XP.

EP Application No. 04 713 936.5-2201—Examination report dated Aug. 17, 2007.

Widyantoro, D.H., et al., "Using Fuzzy Ontology for Query Refinement in a Personalized Abstract Search Engine," Joint 9th IFSA World Congress and 20th NAFIPS Int'l Conf., 2001, Jul. 24, 2001, pp. 610-615, Vancouver, BC, Canada, ISBN: 0-7803-7078-3.

Omelayenko, Borys, "Learning of Ontologies for the Web: the Analysis of Existent Approaches," Proceedings of the Int'l Workshop on Web Dynamics (Held with 8th Int'l Conference of Dastabase Theory) (ICDT'01), Jan. 3, 2001.

* cited by examiner

INFORMATION RETRIEVAL

This application is the US national phase of international application PCT/GB2004/000744 filed 24 Feb. 2004 which designated the U.S. and claims benefit of GB 0306877.2, dated 25 Mar. 2003, the entire content of which is hereby incorporated by reference.

BACKGROUND

1. Technical Field

This invention relates to information retrieval and in particular to a method and apparatus for generating a concept dictionary in respect of an information system for use in retrieving information from that system.

2. Related Art

It is often assumed in prior art electronic information access systems that a user understands something of the structure of the stored data and the methods used to access those data to be able to access relevant information efficiently. In particular, the user may be expected to know terms that appear in stored entries of potential interest and be able to choose query terms that distinguish these entries from others stored in the system. To help avoid this dependence on user knowledge, it is known to use a thesaurus or ontology to convert queries expressed in the user's favoured terms into queries that may enable the system to retrieve the most relevant entries. For example, if no entries are found in response to a query including the word pizza, an ontology might suggest use of the term Italian restaurant instead. However, to be generally applicable, such an ontology must, of necessity, be extremely broad. Experience of the Artificial Intelligence (AI) community suggests that this approach is impractical and that it may be impossible to implement a "universal" AI-based ontology containing human-level general knowledge. In addition, because a universal ontology has to be extremely broad, it tends to over-generalise queries. For example, the word car might be replaced by reasonable synonyms such as auto, automobile, or motorcar but it might also be replaced by machine, railway car, elevator car or gondola which are not relevant to the query.

BRIEF SUMMARY

According to a first aspect of the present invention there is provided a method of generating a concept dictionary for use in querying an information system, comprising the steps of:
(i) receiving an information search criterion;
(ii) deriving, using a lexical reference source, at least one search criterion having related meaning to said received search criterion;
(iii) identifying sets of information in said information system relevant to said received search criterion and to said at least one derived search criterion;
(iv) analysing the identified sets of information to derive relationships between said received search criterion and said at least one derived search criterion in the context of said information system; and
(v) storing, in a concept dictionary, information relating to said received and said at least one derived search criterion and to respective said derived relationships therebetween, for use in querying said information system.

The method according to this first aspect of the present invention is particularly applicable to a small subsystem such as an intranet or database, being arranged to deduce the important concepts and their relationships in that limited domain. A local, system-specific concept dictionary or ontology can be used to help a user to generalise, specialise or select equivalent queries and query terms for use in subsequent information retrieval activities without the user becoming lost in over-generalisation.

Recognising that universal ontologies are too general to be of use for query expansion in a relatively limited domain, preferred embodiments of the present invention attempt to extract only that subset of ontological information relevant to the query mechanism and the stored data in a specific information system and to store that ontological information in a concept dictionary specifically relevant to that information system. The concept dictionary is derived with respect to the complete information system, and is not simply a property of the stored data. Interactions between the actual data stored and the mechanism used to access the data have been found to be important to understanding the relationships between queries; relationships that cannot be accurately derived from the stored data alone.

Preferably the concept dictionary is "fuzzy" in that it allows a concept to be approximately equivalent to another concept, or to have partial membership in a parent concept. Fuzzy modelling and processing techniques are described for example in "Fuzzy Sets" by L. Zadeh, Journal of Information and Control, Volume 8, 1965, pp 338-353, and "Fuzzy Logic Controllers", Parts 1 and 2, by C. Lee, IEEE Transactions on Systems, Management and Cybernetics, Volume 20, 1990, pp 404-435. The application of fuzzy modelling techniques to relate concepts in preferred embodiments of the present invention has been found to be particularly advantageous. Consider, for example, a classified telephone directory. Those directory entries retrieved in response to a query term "garage" might include almost all directory entries that offer "car repair". From this it may be deduced that "car repair" is almost always a more specific concept than "garage". However, relationships derived in this way cannot be guaranteed to be true in all cases. While a conditional probability might be used to relate entries if entries were retrieved with complete certainty, in almost all query-answering systems dealing with semi- or un-structured data different entries satisfy the query to a greater or lesser degree. Since this degree of satisfaction cannot be treated as a pure probability, it is not possible to apply standard probability theory to the relation between two concepts. However, by treating rankings of entries as fuzzy memberships, uncertain relationships between queries can be modelled, for example relationships such as "car repair is almost always a more specific query term than garage".

According to a second aspect of the present invention there is provided a method of accessing sets of information stored in an information system using information search criteria stored in a concept dictionary generated for the information system according to the method defined according to the first aspect of the present invention above, comprising the steps of:

(a) selecting a first information search criterion;
(b) using a search engine to identify one or more sets of information in the information system relevant to said first information search criterion; and
(c) selecting at least one further information search criterion from search criteria stored in the concept dictionary, semantically related to said first information search criterion according to information stored in the concept dictionary, according to whether a more general, a more specialised or an equivalent search is required.

According to a third aspect of the present invention there is provided an information retrieval apparatus for accessing sets of information stored in an information system, comprising;

an input for receiving an information search criterion;

deriving means for deriving, using a lexical reference source, at least one search criterion having related meaning to said received information search criterion;

retrieval means for identifying sets of information in said information system relevant to said received search criterion and to said at least one derived search criterion;

analysis means for analysing said identified sets of information to derive relationships between said received search criterion and said at least one derived search criterion in the context of said information system; and updating means for storing, in a concept dictionary, information relating to said received and said at least one derived search criterion and to respective said derived relationships therebetween, for use in querying said information system.

BRIEF DESCRIPTION OF THE DRAWINGS

Preferred embodiments of the present invention will now be described in more detail, by way of example only, with reference to the accompanying drawings of which.

DETAILED DESCRIPTION OF EXEMPLARY EMBODIMENTS

An apparatus, according to preferred embodiments of the present invention, for use in retrieving information data sets from an information system, will firstly be described with reference to FIG. 1.

Figure 1:
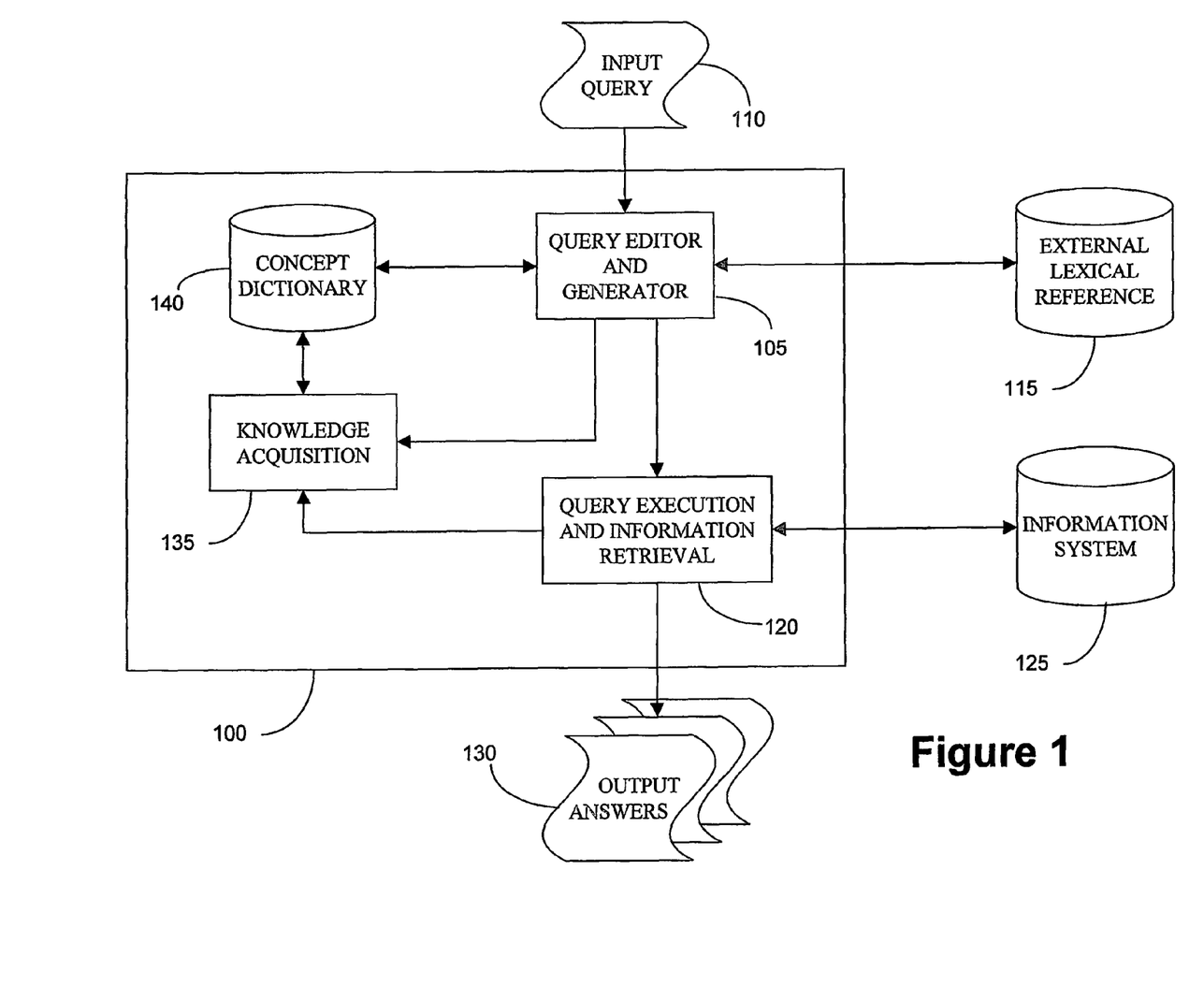
FIG. 1 is diagram showing features of an information retrieval apparatus according to a preferred embodiment of the present invention.

Referring to FIG. 1, a preferred information retrieval apparatus 100 comprises a query editor and generator 105 arranged to receive an input query 110 entered by a user or otherwise retrieved from a store of queries. The query editor and generator 105 is arranged with access to an external lexical reference source 115 to enable one or more queries having a related meaning to the input query 110 to be derived, for example by substituting a noun occurring in the input query 110 with a semantically related noun or phrase obtained from the external lexical reference source 115. A lexical database suitable for this purpose is Wordnet™, accessible over the Internet at http://www.cogsci.princeton.edu/~wn/.

A query execution and information retrieval module 120 arranged to receive the input query 110 and each of the derived queries generated by the query editor and generator 105, and to identify information data sets, stored in an information system 125, relevant to each of the received queries. The module 120 may be a conventional search engine arranged to implement a known information searching algorithm, preferably one arranged to calculate, for each identified set of information, a weighting factor indicative of the degree of relevance of each identified set of information to the respective executed query.

Those sets of information identified by the information retrieval module 120 as being relevant to the input query 110 in particular, are output as answers 130. In addition the results of the information retrieval (120) in respect of the input query 110 and each of the queries derived by the query editor and generator 105 are received by a knowledge acquisition module 135, together with the input (110) and derived (105) queries themselves, for analysis. The knowledge acquisition module 135 is arranged to execute an algorithm for deriving semantic relationships between the input (110) and derived (105) queries on the basis of the results of information retrieval by the module 120 from the information system 125. In particular, the knowledge acquisition module 135 is arranged to determine whether one of the queries, or terms comprised in the query, represents a specialisation or a generalisation of another of the queries on the basis of the relative scope of information retrieved by the module 120. In this way, any semantic relationships suggested with reference to the external lexical reference 115 when generating the derived queries (105) are tested in the specific context of the information system 125 and a measure of the extent to which the suggested relationships apply in that context is determined by the knowledge acquisition module 135. A store is provided to store a concept dictionary 140 in respect of the information system 125, the concept dictionary 140 comprising a record of each of the queries, input (110) and derived (105), and the respective measures determined by the knowledge acquisition module 135 of semantic relationships therebetween, or between terms comprised in those queries. As new input queries 110 are received, the knowledge acquisition module 135 is able to update the concept dictionary 140 by adding new queries and new relationships and by updating values associated with previously stored relationships, thereby capturing new "knowledge" about the concepts embodied in the information system 125 and in the user's choice of queries (110).

Once the concept dictionary 140 has been established through a period of use of the apparatus 100, it may be used by the query editor and generator 105 to enable a user to select further queries to use in interrogating the information system 125 according to whether the user wishes to expand the scope of information retrieval, to reduce its scope or merely to search the information system 125 using semantically equivalent queries. Each time the user does use the apparatus 100 to retrieve information, particularly when the user enters a new query 110 not previously used, the knowledge acquisition module 135 is able to constantly update and improve the store of "knowledge" in the concept dictionary 140 for the ongoing benefit of users of the information system 125.

In a preferred embodiment of the present invention, to be described below, the knowledge acquisition module 135 and the concept dictionary 140 are arranged, respectively, to process and to store fuzzy relationships between queries and hence to provide a less precise (less "crisp") and thus more appropriate measure of semantic equivalence for storage in the concept dictionary 140. This has the advantage that lines of enquiry may be suggested to and selected by users of the apparatus 100 that would not ordinarily have been apparent with more precise "crisp" processing, with the potential to yield more useful results from the information system 125. The decision to use fuzzy processing techniques in preferred embodiments of the present invention recognises the fact that information retrieval on the basis of user-supplied queries is a relatively imprecise process. Fuzzy processing has the potential to extract more useful information from the implicit and explicit assumptions behind a user's choice of input query and the body of information in the information system 125 than is possible with crisp processing of semantic relationships.

However, before discussing the preferred use of fuzzy processing by the apparatus 100, an example will described to show how the concept dictionary 140 may be populated with "knowledge" acquired using "crisp" processing techniques.

Consider two queries Q1 and Q2, with their corresponding answer sets S1 and S2 obtained by interrogating the information system 125. Assume these answer sets to be completely certain, rather than weighted to some degree of relevance. Assume that $$Q1\text{="find a garage in Ipswich"}$$

and $$Q2\text{="find car repair in Ipswich"}$$

and that the information system 125 returns a set of answers to the second query, S2, which is a subset of S1. It may be deduced from this that "car repair" is a term having a more restricted meaning than the term "garage". A human expert is able to recognise cases of generalisation and specialisation in queries, but known techniques can also be used to achieve this automatically, for example with reference to a lexical database such as Wordnet™, accessible over the Internet at http://www.cogsci.princeton.edu/~wn/, and able to supply, for example, hotel as a synonym for the noun inn. If this is a valid equivalence in the context of the information system 125, it may be expected that the information system 125 would return an identical sets of answers in response to a query searching for hotels in a particular location and to a query searching for inns in the same location.

Formally, let Q(x) denote a query predicate that returns true or false according to whether or not an entry x is relevant to the query Q. Then the set of solutions $$SQ=\{x|Q(x)\}$$

is the set of all entries x that satisfy (are relevant to) the query Q. It can be stated that for two queries, Q and P:

Q generalises P if $SP \subset SQ$
Q specialises P if $SQ \subset SP$
Q is equivalent to P if $SQ = SP$ Consider the following set of queries and corresponding answers:

| id | queryid | Query | ansid | Answer Entry |
|---|---|---|---|---|
| 1 | q1 | car hire in Ipswich | a1 | Eurodollar rent a car |
| 2 | q1 | car hire in Ipswich | a2 | Autorent (UK) |
| 3 | q2 | car rental in Ipswich | a1 | Eurodollar rent a car |
| 4 | q2 | car rental in Ipswich | a2 | Autorent (UK) |
| 5 | q3 | restaurant in Suffolk | a3 | Church Yards Seafood Restaurant |
| 6 | q3 | restaurant in Suffolk | a4 | Curry Inn |
| 7 | q3 | restaurant in Suffolk | a5 | Passage To India |
| 8 | q3 | restaurant in Suffolk | a6 | Chicago Rock Cafe |
| 9 | q4 | restaurant in Ipswich | a5 | Passage To India |
| 10 | q4 | restaurant in Ipswich | a6 | Chicago Rock Cafe |
| 11 | q5 | Indian restaurant in Suffolk | a4 | Curry Inn |
| 12 | q5 | Indian restaurant in Suffolk | a5 | Passage To India |
| 13 | q6 | Indian restaurant in Ipswich | a5 | Passage To India |

By the above reasoning, the answers to queries q3, q4, q5 and q6 in the table above can be used to deduce that Ipswich is more specific term than Suffolk and that Indian Restaurant is a more specific term than Restaurant. Such deduced information may be stored in a concept dictionary 140 and used subsequently to assist users in generalising or specialising their queries.

The relationships between queries or query terms as derived in the example above are examples of "crisp" relationships. They are derived on the basis that the answers to the submitted queries are certain. In practice this is not generally the case. The preferred approach for use in embodiments of the present invention is to extend the ideas above to allow partial relevance of answer entries to queries and to convert the crisp relationships into fuzzy relationships. In this preferred approach the definitions of generalisation, specialisation and equivalence are expanded to cater for partial inclusion and approximate equality.

A method will now be described for deriving relationships between queries using fuzzy processing techniques for implementation by the apparatus 100 and in particular by the knowledge acquisition module 135 according to a preferred embodiment of the present invention. Preferably, the knowledge acquisition module 135 determines the degrees to which a query P generalises a query Q and to which the query P specialises the query Q for each pair of queries P and Q, in the context of the information system 125, using a representation framework known as the "mass assignment framework" in combination with a technique for calculating conditional probabilities of fuzzy sets called "semantic unification". These techniques are taught for example in the following published documents: J. F. Baldwin (1992) in "The Management of Fuzzy and Probabilistic Uncertainties for Knowledge-based Systems.", in the Encyclopedia of AI, edited by S. A. Shapiro, published by John Wiley ($2^{nd}$ edition), pages 528-537; J. F. Baldwin (1992) "Mass Assignments and Fuzzy Sets for Fuzzy Databases" in *Advances in the Shafer Dempster Theory of Evidence,* edited by M. Fedrizzi, J. Kacprzyk and R. R. Yager, published by John Wiley; J. F. Baldwin and T. P. Martin (2001) in "Towards Inductive Support Logic Programming", *Proc. IFSA-NAFIPS* 2001, Vancouver, pages 1875-1880; and J. F. Baldwin, J. Lawry, and T. P. Martin in "Efficient Algorithms for Semantic Unification", in *Proc. Information Processing and the Management of Uncertainty,* 1996, Spain.

Considering firstly a proposition that a query P generalises a query Q. This proposition is represented by the rule $$\text{Relevant}(P, E) \leftarrow \text{Relevant}(Q, E)$$

where E is an entry (set of information) identifiable in the information system 125. The degree to which this rule applies in respect of the queries P and Q may be calculated from the fuzzy conditional $$\{x: \text{Relevant}(P,x)\} | \{x: \text{Relevant}(Q,x)\}$$

where x is a set of information in the information system 125, the calculation being performed over mass assignment elements making up fuzzy answer relations SP and SQ. For example, suppose that execution of the query P by the information retrieval module 120 returns the fuzzy answer relation $$SP=\{a1: 1, a2: 1, a3: 0.7, a4: 0.6\}$$

and execution of the query Q returns $$SQ=\{a1: 1, a2: 0.8, a3: 0.5\}$$

In these fuzzy answer relations, a1, a2, . . . etc. are answer identifiers, e.g. as used in the table above, and the values are fuzzy membership values for each answer calculated for example by the information retrieval module 120 by conventional means and representative of the degree to which the respective answer would be included in a response to the respective query by the information system 125. Each value is essentially a measure of the relevance of the answer to the query as may be determined by any one of a number of known information retrieval algorithms.

Intuitively, from an inspection of the fuzzy answer relations SP and SQ, the query P seems to be more general than the query Q, since Q returns fewer answers from the information system 125 and lower membership values in two cases (a2 and a3) than P. To calculate the degree of support for the proposition that the query Q is generalised by P, a mass assignment is firstly formed on each of the fuzzy answer relations, as follows:

$$m(SP)=\{<a1,a2>\}: 0.3, \{<a1,a2>, <a1,a2,a3>\}: 0.1, \{<a1,a2>, <a1,a2,a3>, <a1,a2,a3,a4>\}: 0.6$$

$$m(SQ)=\{<a1>\}: 0.2, \{<a1>, <a1,a2>\}: 0.3, \{<a1>, <a1,a2>, <a1,a2,a3>\}: 0.5$$

where the notation $$\{<a1>, <a1,a2>\}: 0.3$$

indicates a degree of support of 0.3, from an interval [0,1], for the set of relevant answers to be either a1 or both a1 and a2, the values, e.g. 0.3, being obtained by subtracting consecutive fuzzy membership values in the fuzzy relations SP and SQ. For example, in the mass assignment for SP, answer a1 cannot arise in isolation because the answer a2 also has a fuzzy membership value of 1 in the fuzzy relation SP, so the probability mass for $\{<a1>\}$ is 0. However, the probability mass for $\{<a1,a2>\}$ is 1−0.7=0.3, and that for $\{<a1,a2>, <a1,a2,a3>\}$ is 0.7−0.6=0.1, etc.

The next step is to use the "standard point semantic unification" algorithm, described for example in the last of the four references listed above, to derive the degree of support for the rule Relevant(P, E)←Relevant(Q, E)

from the mass assignments m(SP) and m(SQ).

For each of the answer combinations arising for the query Q, the question to be asked in the semantic unification process is: is it possible, and if so what is the probability that given a particular answer combination for the query P, the answer combination for Q would arise? The answers to this question are presented for each of the queries in the table below, where the mass assignments for SQ are written along the top of the table and those for SP are written down the left hand side.

|  | $\{<a1>\}$: 0.2 | $\{<a1>, <a1, a2>\}$: 0.3 | $\{<a1>, <a1, a2>, <a1, a2, a3>\}$: 0.5 |
|---|---|---|---|
| $\{<a1, a2>\}$: 0.3 | 0 | ½ × 0.3 × 0.3 | ⅓ × 0.3 × 0.5 |
| $\{<a1, a2>, <a1, a2, a3>\}$: 0.1 | 0 | ½ × 0.1 × 0.3 | ⅔ × 0.1 × 0.5 |
| $\{<a1, a2>, <a1, a2, a3>, <a1, a2, a3, a4>\}$: 0.6 | 0 | ½ × 0.6 × 0.3 | ⅔ × 0.6 × 0.5 |

Taking the first column, first row, it can be seen intuitively there is no possibility that if the answer to a query was <a1>alone that the answer to the query can be a1 and a2 (<a1,a2>). However, in the first row, second column the question asked is whether the answer could be $\{<a1,a2>, <a1,a2,a3>\}$ given that it was $\{<a1>, <a1,a2>\}$. The probability of this is the product of the individual probability masses multiplied by a factor indicative of the likelihood of the common answer combinations arising within the given answer combination. In the case of the first row, second column, assuming <a1>and <a1, a2>to be equally likely gives the factor ½ since if the answer is <a1, a2>then the answer could be $\{<a1,a2>, <a1,a2,a3>\}$ whereas if the answer is <a1>then it cannot.

Each cell is weighted by the corresponding likelihood factor and the product of the respective probability masses, and the overall degree of support (semantic unification value) for the rule Relevant(P, E)←Relevant(Q, E)

is calculated as the sum over all cells in the table, giving a semantic unification value for this rule of 0.433.

A similar exercise can be carried out to test the support for the rule

Relevant(Q, E)←Relevant(P, E)

which gives for this example a semantic unification value 0.548.

The knowledge acquisition module 135 is arranged to perform the fuzzy analysis described above in respect of each combination of queries selected from the input query 110 and the corresponding queries generated by the query editor and generator 105, using the corresponding answer responses obtained from the information system 125 by the query execution and information retrieval module 120. The semantic unification values representing the degree of support for generalisation and for specialisation of one query by another are calculated and stored by way of an update to the concept dictionary 140, along with the respective queries themselves (if not already stored).

The process of updating the concept dictionary 140 starting from receipt of an input query 110 can be summarised and will now be described with reference to the flow diagram of FIG. 2.

Figure 2:
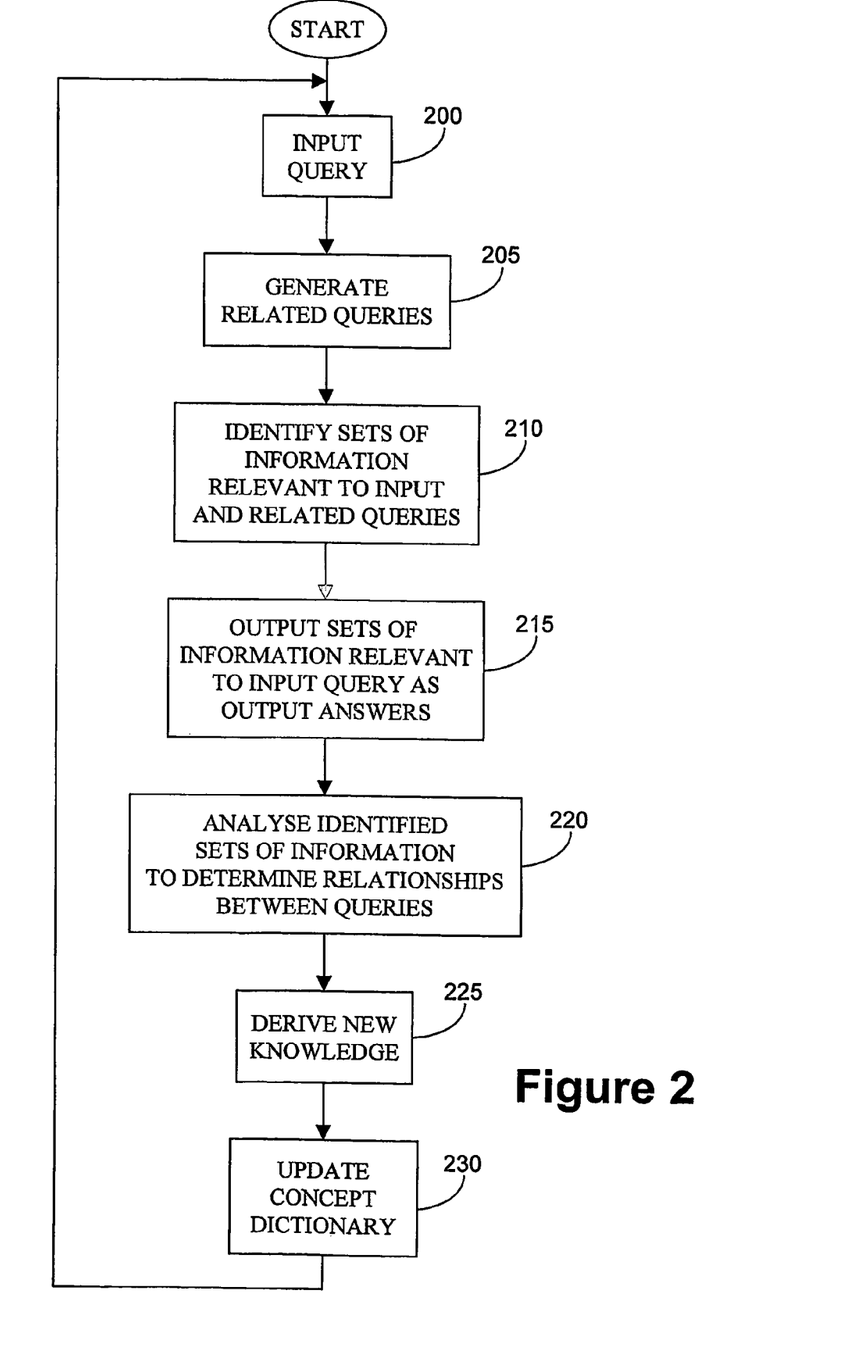
FIG. 2 is flow diagram showing preferred steps in operation of the apparatus of FIG. 1.

Referring to FIG. 2, and additionally to FIG. 1, at STEP 200 an input query 110 is received by the query editor and generator 105 in the apparatus 100. At STEP 205, the query editor and generator 105 generates a set of queries related semantically to the input query 110 with reference to an external lexical reference source 115 such as Wordnet, referenced above. In particular, the external lexical reference source 115 is used to obtain, for a noun of the input query 110, at least one of three types of semantically related noun, as follows (these are WordNet options, for example):

Synsets—roughly equivalent terms
Hypernym—super types (less restricted terms)
Hyponym—subtype (more restricted terms)

Each of the returned nouns is used to generate a related query by replacing the respective noun in a copy of the input query 110.

At STEP 210, the input query 110 and the related queries generated at STEP 205 are executed by the information retrieval module 120 to identify sets of information stored in the information system 125 relevant to each of those queries. Preferably, in order to distinguish one set of information identified by the information retrieval module 120 from another, where distinct identifiers are not already defined and returned for each different set of information in the information system 125, then either the information retrieval module 120 itself or the knowledge acquisition module 135 are arranged to compare retrieved sets of information and to assign a unique identifier to each distinct set of information so identified. If a particular related query returns no answers, it is assumed to be an inappropriate change to the input query 110 and is discarded.

Those sets of information identified as being relevant to the input query 110 in particular, or at least assigned identifiers and/or references to those sets of information, are output at STEP 215 as a set of output answers 130 in response to the input query 110. At STEP 220 the information retrieval results output from the module 120, following execution of the queries at STEP 210, are analysed by the knowledge acquisition module 135, along with the input query 110 and the related queries from STEP 205, to determine the degree of support for each of the different semantic relationships, i.e. generalisation, specialisation and hence similarity, between those queries, using one of the methods described above. The results of this analysis are used at STEP 225 to derive new knowledge about the information system 125, in particular to deduce the position of a newly input or derived query or its constituent terms in a semantic hierarchy of queries and/or query terms, and to analyse the queries themselves to deduce whether a particular term of one query is semantically equivalent or related by generalisation or specialisation to a term of another query. In order to deduce semantic equivalence, the knowledge acquisition module 135 is arranged to interpret the semantic unification values associated with generalisation and specialisation of one query by another: for example, if both values are "high", the respective queries are interpreted to be semantically equivalent and a value representative of the degree of equivalence is taken to be the mean of the generalisation and specialisation values; if the value for generalisation is "low" and that for specialisation is "high", or vice versa, then specialisation or generalisation, respectively, holds; and if both values are "low", the semantic relationship between the queries is considered "weak". A threshold value or a fuzzy set may be defined by the knowledge acquisition module 135 in respect of the information system 125, to control interpretation of "high" and "low". For example, "low" may be a value "below 0.5", or a fuzzy set may define "low" as {<0.3 is definitely low, >0.5 is definitely not low, 0.3-0.5 is fuzzy low}. However, the value ranges applicable in respect of a particular information system 125 may be adjusted by means of simple experiments.

At STEP 230, the results of the analysis step 220 and the derive new knowledge step 225 are used to update a concept dictionary 140 generated and maintained by the apparatus 100 in respect of the information system 125.

Preferably, the concept dictionary 140 comprises data representative of a graph structure having nodes comprising query words or terms, e.g. "garage", interlinked, where respective relationships have been derived, with the respective values indicating the degree of support calculated for the relationship—generalisation, specialisation or equivalence. The links represented in the concept dictionary 140 may be followed from one node to another to obtain a more generalised or more specialised word or phrase. Each link is a two-way link; following the link in one direction leads to a semantically more specialised node, in the other direction to a more general node, in the context of the respective information system 125. Preferably, a hash table is stored as part of the concept dictionary 140 to provide a link to a node of the graph structure from a given word or phrase, e.g. one entered by a user at a user interface. By way of example, a portion of a graph structure represented by data stored in the concept dictionary 140 will now be described with reference to FIG. 3.

Figure 3:
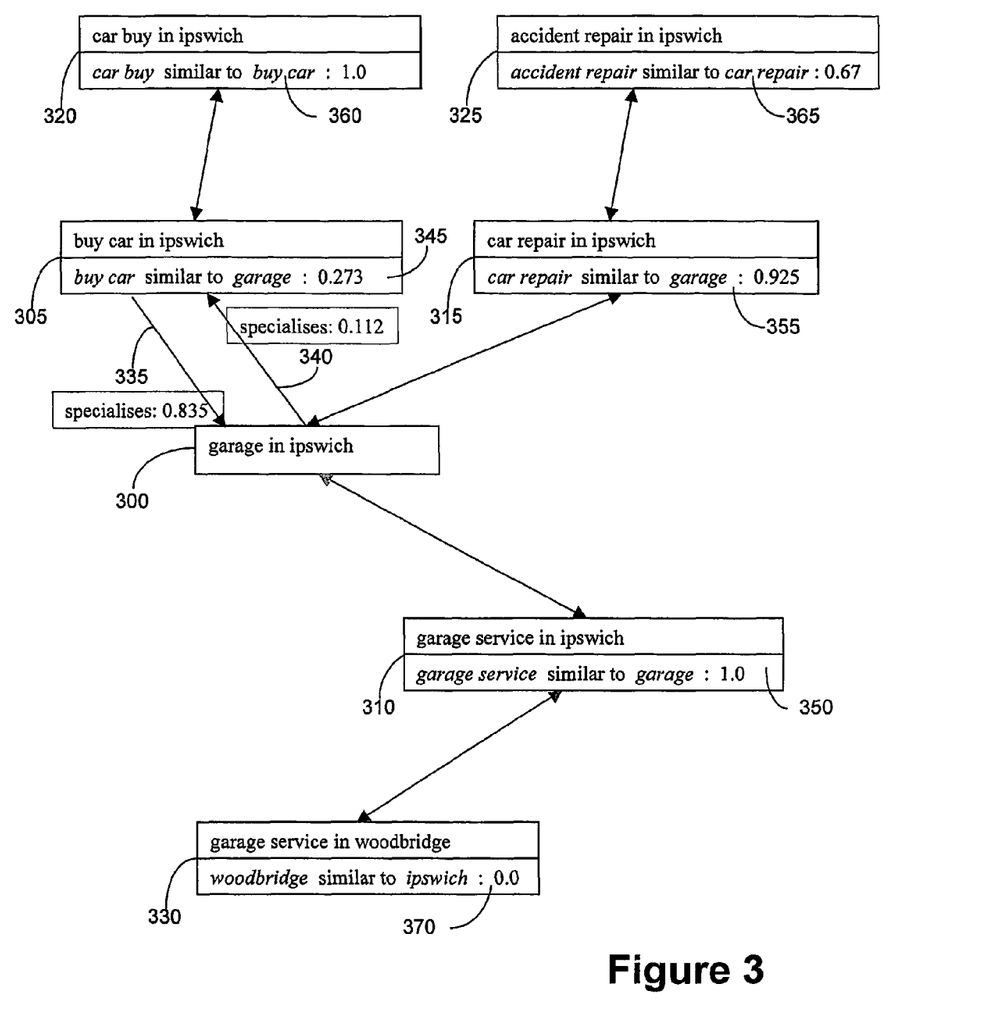
FIG. 3 is a diagram representing in graphical form an example of knowledge stored in a concept dictionary generated according to preferred embodiments of the present invention.

Referring to FIG. 3, a graph structure is shown comprising a number of query nodes 300-330 and links therebetween representative of derived semantic relationships. In particular, the query node 300 "garage in Ipswich" is shown linked to the query node 305 "buy car in Ipswich". Stored semantic unification values, calculated in respect a specialisation of the query node 300 by the query node 305, and vice versa, are also shown alongside the links 335 and 340 respectively. Also shown as part of each of the query nodes 305-330 are statements 345-370 derived during STEP 225 of the process described above with reference to FIG. 2. These statements defining the strength of relationships between query terms, measures (in the range [0,1]) of the degree of "similarity" between terms in the example of FIG. 3. For example, in query node 305, it has been calculated, using the semantic unification vales derived in respect of the relationship between query node 305 and query node 300, that the term "buy car" is similar to the term "garage" with fuzzy membership value 0.273. That is, the terms have been found to be relatively dissimilar, as would be expected given the semantic unification value of 0.835 in support of specialisation by the query node 305 of the node 300 and only 0.112 in support of specialisation by the query node 300 of the node 305.

When presented in the form shown in FIG. 3, the contents of the concept dictionary 140 can be seen to provide a useful source of information to users wishing to make alterations to queries for use in interrogating a respective information system 125. In particular, having received the results of a search of the information system 125 using a first query made up of terms already known in the concept dictionary 140, it would be clear from an inspection of links emanating from the node corresponding to the first query what alterations would need to be made to either generalise or specialise the first query to, respectively, expand of reduce the scope of the returned query results with a reasonable chance of success.

By way of example of the way in which a user may exploit the knowledge embodied in a concept dictionary 140 generated using preferred embodiments of the present invention, consider that the following knowledge has been accumulated in a concept dictionary 140, derived from previously used queries and query answers supplied by a respective information system 125, with each relationship having a high level of support (high semantic unification value):

Italian restaurant generalisation_of pizza
takeaway food generalisation_of pizza
takeaway food generalisation_of fish and chips
takeaway food generalisation_of Chinese takeaway If a user finds that no answers are returned by the information system 125 in response to a query "Find pizza in Ipswich"

then the knowledge (140) above may be used to suggest two possible query generalisations to improve the chances of obtaining useful answers, as follows:

"Find Italian restaurant in Ipswich"
"Find takeaway food in Ipswich"

If the user finds that the latter query was too general, i.e. it resulted in too many answers, then alternatives to this query may be offered, with reference to the knowledge above, by specialisation:

"Find fish and chips in Ipswich"
"Find Chinese takeaway in Ipswich"

In this way, not only has the user been able to make relevant adjustments to the choice of query in order to vary the responses given by the information system 125, but an alternative line of enquiry has also been suggested that may not have been apparent to the user of that particular information system 125.

Preferably, a user interface is provided with the apparatus 100 (not shown in FIG. 1) to enable a user to submit queries 110 to the apparatus 100 and to receive output answers 130 from the apparatus 100 in response. The user interface may also be arranged to enable a user to navigate knowledge stored in the concept dictionary 140, preferably with the aid of a graphical user interface showing derived relationships between query nodes and query terms in a manner similar to that shown in FIG. 3, in particular to enable the user to select particular queries and to request suggestions of more generalised, more specialised or semantically equivalent queries to execute in a respective information system 125.

Preferably, an apparatus 100 according to preferred embodiments of the present invention is implemented as a suite of computer programs using the Java programming language for running on a conventional server computer. The concept dictionary 140 is implemented using a conventional relational database management system such as Oracle™, although this too can be implemented using Java.

Besides use as an information retrieval method and apparatus, preferred embodiments of the present invention may be used to test the effectiveness of existing information retrieval systems. For example, the apparatus 100 may be linked to an existing information retrieval system so that the query generator and editor 105 is arranged to receive (in a monitoring role) queries entered by a user of the existing system and the query execution and information retrieval module 120 is arranged with access to submit queries to the existing system and to receive corresponding answers. Over a period of time in use, a concept dictionary 140 generated in respect of the existing system, by the process described above with reference to FIG. 2, may be exported in a format useable in the existing system and used to test the effectiveness of a query interface provided by the existing system, for example by comparing the results of executing queries suggested by the existing system with the results of executing queries suggested with reference to the generated concept dictionary 140.

In another mode of operation of preferred embodiments of the present invention, a bulk querying process may be implemented whereby a set of queries is built up and then sent into the apparatus 100 as input queries 110. This mode of operation may be particularly useful when a concept dictionary 140 needs to be generated quickly rather than over an extended period of use of the apparatus 100 with a particular information system 125.

In another mode of operation of preferred embodiments of the present invention, a concept dictionary (140) generated in respect of a particular information system 125 may be exported in a format useable in another information retrieval system, also arranged with access to the information system 125, as a source of knowledge for use in querying the information system 125 through the other information retrieval system.

What is claimed is:

1. A method of generating a concept dictionary for use in querying an information system comprising:
    (i) receiving an information search criterion;
    (ii) deriving from said received search criterion, using a lexical reference source, at least one different search criterion having related meaning to said received search criterion;
    (iii) identifying a set of information in said information system relevant to said received search criterion and a different set of information in said information system relevant to said at least one derived search criterion;
    (iv) analyzing the identified sets of information and deriving from similarities and differences therebetween relationships between said received search criterion and said at least one derived search criterion in the context of said information system; and
    (v) storing, in a concept dictionary, information relating to said received and said at least one derived search criterion and to respective said derived relationships therebetween, for use in querying said information system.

2. A method as in claim 1, wherein, at step (i), receiving an information search criterion comprises selecting an information search criterion stored in said concept dictionary.

3. A method as in claim 1, wherein, at step (ii), deriving at least one search criterion having related meaning comprises replacing a term of said received search criterion with a related term having a more specific meaning according to said lexical reference source.

4. A method as in claim 1, wherein, at step (ii) deriving at least one search criterion having related meaning comprises replacing a term of said received search criterion with a related term having a more general meaning according to said lexical reference source.

5. A method as in claim 1, wherein, at step (ii) deriving at least one search criterion having related meaning comprises replacing a term of said received search criterion with a related term having an equivalent meaning according to said lexical reference source.

6. A method as in claim 1, wherein, at step (ii), said lexical reference source is a thesaurus.

7. A method as in claim 1, wherein, at step (ii), said lexical reference source is an ontological database.

8. A method as in claim 1, wherein, at step (ii), a plurality of search criteria are derived, each having related meaning to said received search criterion, and wherein at step (iv), the respective identified sets of information are analyzed to derive relationships between search criteria comprised in said plurality of derived search criteria.

9. A method as in claim 1, wherein, at step (iv), deriving relationships between said search criteria comprises performing fuzzy processing of said derived search criteria and respective said identified sets of information to determine a measure of the and/or of one said search criterion over another in the context of said information system.

10. A method of accessing sets of information stored in an information system using information search criteria stored in a concept dictionary generated for the information system according to the method in claim 1, further comprising:
    (a) selecting a first information search criterion;
    (b) using a search engine to identify one or more sets of information in the information system relevant to said first information search criterion; and
    (c) selecting at least one further information search criterion from search criteria stored in the concept dictionary, semantically related to said first information search criterion according to information stored in the concept dictionary, according to whether a more general, a more specialized or an equivalent search is required.

11. An information retrieval apparatus for accessing sets of information stored in an information system, said apparatus comprising;
    an input for receiving an information search criterion;
    deriving means for deriving from said received search criterion, using a lexical reference source, at least one different search criterion having related meaning to said received information search criterion;
    retrieval means for identifying a set of information in said information system relevant to said received search criterion and a different set of information in said information system relevant to said at least one derived search criterion;
    analysis means (135) for an analyzing said identified sets of information and deriving from similarities and differences therebetween relationships between said received search criterion and said at least one derived search criterion in the context of said information system; and
    updating means for storing, in a concept dictionary, information relating to said received and said at least one derived search criterion and to respective said derived relationships therebetween, for use in querying said information system.

* * * * *